United States Patent
Taylor

(10) Patent No.: US 6,974,171 B1
(45) Date of Patent: Dec. 13, 2005

(54) TOOL BOX SKIRT

(76) Inventor: Michael A. Taylor, 318 Hillside Cir., Stonewall, LA (US) 71078

(*) Notice: Subject to any disclaimer, the term of this patent is extended or adjusted under 35 U.S.C. 154(b) by 0 days.

(21) Appl. No.: 10/818,329

(22) Filed: Apr. 5, 2004

(51) Int. Cl.[7] .......................................... B60R 11/00
(52) U.S. Cl. ..................... 296/37.6; 224/404; 160/40
(58) Field of Search ....................... 296/37.6; 224/402, 224/403, 404, 542; 160/40

(56) References Cited

U.S. PATENT DOCUMENTS

| | | | |
|---|---|---|---|
| 4,580,827 A * | 4/1986 | Feagan ...................... 296/37.6 |
| 5,121,959 A * | 6/1992 | King ......................... 296/37.6 |
| 5,201,561 A * | 4/1993 | Brown ...................... 296/37.5 |
| 5,303,969 A | 4/1994 | Simnacher ................ 296/37.6 |
| 5,382,069 A * | 1/1995 | Chambers ................. 296/37.6 |
| 5,419,476 A | 5/1995 | White ........................ 224/273 |
| 5,772,271 A | 6/1998 | Sanders ....................... 296/32 |
| 5,788,307 A | 8/1998 | Gilbert ......................... 296/32 |
| 5,848,818 A | 12/1998 | Flueckinger ............... 296/37.6 |
| 5,938,263 A | 8/1999 | Barthelman ................ 296/37.6 |
| 5,944,372 A | 8/1999 | Gilbert ...................... 296/37.6 |
| 5,992,719 A * | 11/1999 | Carter, III ................... 224/404 |
| 6,068,319 A * | 5/2000 | O'Brien ..................... 296/37.6 |
| 6,234,559 B1 | 5/2001 | Block et al. .......... 296/100.06 |
| 6,527,318 B2 | 3/2003 | Kolper ....................... 293/126 |
| 6,582,012 B1 | 6/2003 | Smith ......................... 296/208 |

* cited by examiner

*Primary Examiner*—Patricia L. Engle
(74) *Attorney, Agent, or Firm*—R. Keith Harrison

(57) ABSTRACT

A tool box skirt for mounting on a truck tool box in a pickup truck bed and preventing entry of debris into spaces between the truck tool box and the pickup truck bed is disclosed. The tool box skirt includes a skirt frame for attachment to the truck tool box. A skirt is carried by the skirt frame for partitioning the spaces in the pickup truck bed.

15 Claims, 2 Drawing Sheets

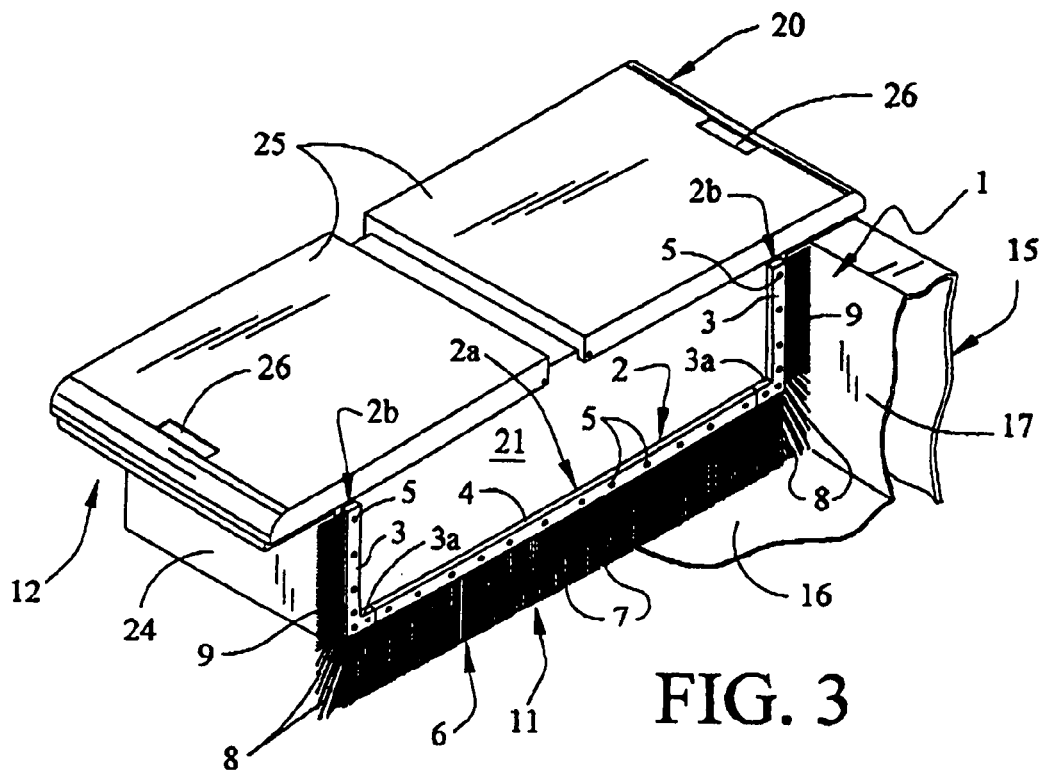
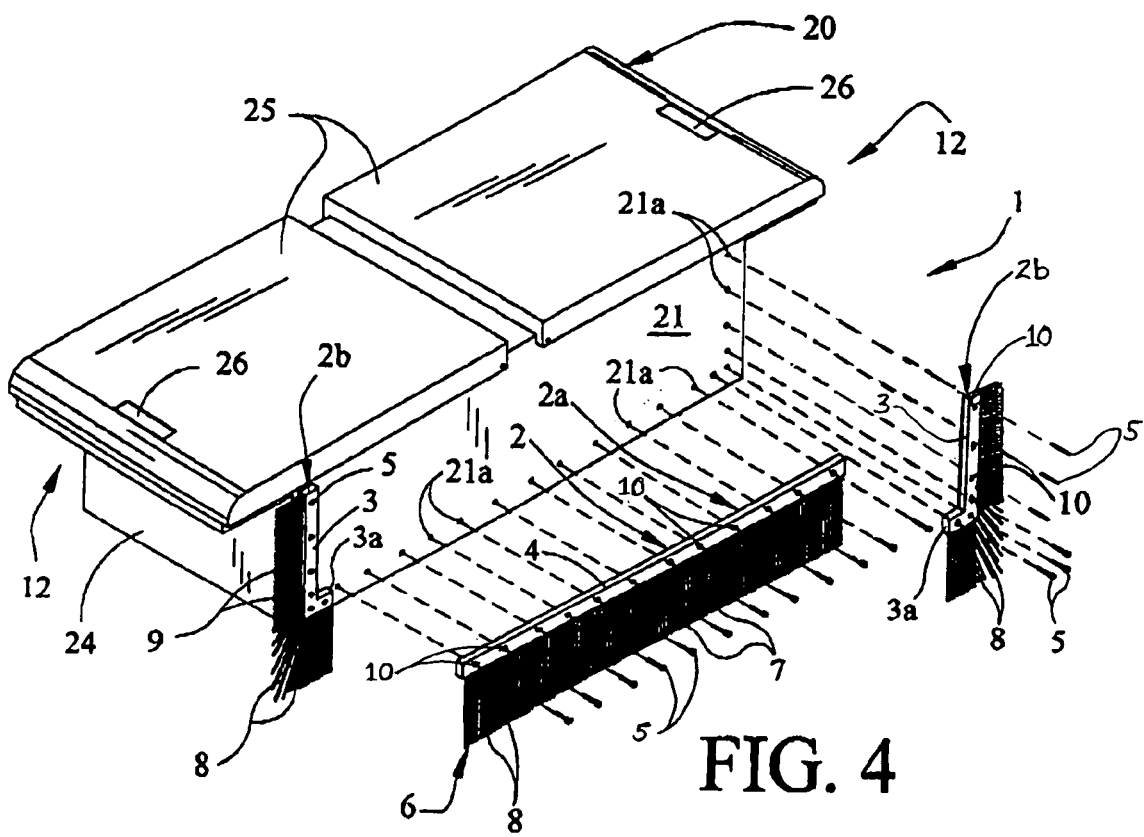

TOOL BOX SKIRT

FIELD OF THE INVENTION

The present invention relates to tool boxes which are mounted in pickup truck beds for the storage and/or transport of tools, equipment and other items in a pickup truck. More particularly, the present invention relates to a tool box skirt which can be mounted on a truck tool box to block spaces between the tool box and the pickup truck bed and prevent debris from inadvertently entering the spaces.

BACKGROUND OF THE INVENTION

Tool boxes are commonly mounted in the beds of pickup trucks for the storage and/or transport of tools and other equipment or items in the trucks. Truck tool boxes typically include an elongated, box-shaped enclosure which is transversely mounted in the front portion of the pickup truck bed, behind the pickup truck cab. The enclosure includes one or multiple lids which can be opened to access the contents of the enclosure.

Typically, the bottom panel of the tool box is disposed in spaced-apart relationship to the truck bed bottom, whereas the side panels of the tool box are spaced-apart from the respective truck bed sides, of the pickup truck bed. Furthermore, the rear panel of the tool box may be spaced from the front wall of the pickup truck. Accordingly, it is common for trash and other debris to be blown or inadvertently pushed from the pickup truck bed, into the space or spaces between the tool box and the bed bottom and sides. Due to the small clearance between the tool box and the pickup truck bed, the debris can be difficult to remove from these relatively inaccessible areas. Accordingly, a device is needed which substantially prevents debris from inadvertently entering the spaces between a truck tool box and the sides, bottom and front of a pickup truck bed.

SUMMARY OF THE INVENTION

The present invention is generally directed to a novel tool box skirt which can be mounted on a tool box in a pickup truck bed to block spaces between the tool box and the sides, bottom and front of the pickup truck bed and prevent debris from inadvertently entering the spaces. The tool box skirt typically includes a skirt frame which is mounted on the tool box and a flexible or resilient skirt which extends from the skirt frame. Accordingly, the skirt blocks the inadvertent passage of debris from the pickup truck bed and into the spaces while allowing the extension of elongated items, such as ladders and lumber, for example, from the pickup truck bed into the spaces during storage and transport of the items in the truck bed.

BRIEF DESCRIPTION OF THE DRAWINGS

The invention will now be described, by way of example, with reference to the accompanying drawings, in which:

FIG. 3 is a perspective view of the tool box skirt of the present invention, mounted in functional position on the truck tool box, with the pickup truck bed shown partially in section; and FIG. 4 is an exploded, perspective view of the tool box skirt of the present invention, more particularly illustrating a typical fastener technique for mounting the tool box skirt on the truck tool box.

DETAILED DESCRIPTION OF THE INVENTION

Figure 2:
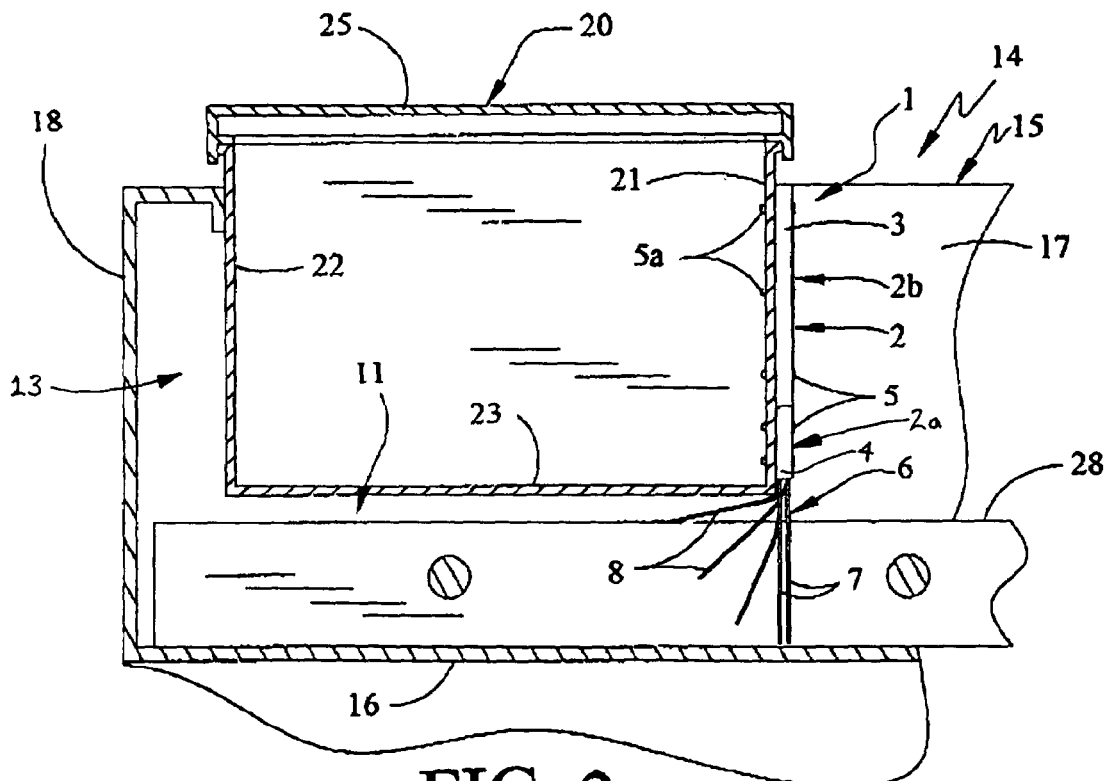
FIG. 2 is a cross-sectional view, taken along section lines 2–2 in FIG. 1, more particularly illustrating a typical fastener technique for mounting the tool box skirt on the truck tool box.

Referring to the drawings, an illustrative embodiment of the tool box skirt of the present invention is generally indicated by reference numeral 1. The tool box skirt 1 is suitable for mounting on a conventional truck tool box 20 which is provided in a truck bed 15 of a conventional pickup truck 14. The truck bed 15 includes a bed bottom 16; parallel, upward-standing bed sides 17; and a front wall 18 (FIG. 2). The truck tool box 20 typically includes a front panel 21, a rear panel 22, a bottom panel 23 and side panels 24 (one of which is shown in FIG. 3). One or multiple lids 25, each having a handle 26, is hingedly attached typically to the rear panel 22 for opening and closing of the truck tool box 20.

As illustrated in FIG. 2, a bottom space 11 is defined between the bed bottom 16 and the bottom panel 23 of the truck tool box 20. A rear space 13 may further be defined between the front wall 18 of the truck bed 15 and the rear panel 22 of the truck tool box 20. As illustrated in FIGS. 3 and 4, a side space 12 is defined between each bed side 17 (FIG. 1) and the corresponding side panel 24 of the truck tool box 20. As hereinafter described, the tool box skirt 1 is suitable to be mounted on the truck tool box 20 in order to partition the bottom space 11 and the side spaces 12 from the main portion of the truck bed 15 and prevent the inadvertent entry of debris (not illustrated) into the bottom space 11 and side spaces 12.

Referring to FIGS. 3 and 4 of the drawings, the tool box skirt 1 includes a skirt frame 2 having an elongated horizontal frame member 2a and a pair of substantially parallel, spaced-apart, vertical frame members 2b. In assembly of the tool box skirt 1, as hereinafter further described, the horizontal frame member 2a and the vertical frame members 2b are attached to the exterior surface of the front panel 21 of the truck tool box 20, with the generally parallel vertical frame members 2b disposed at respective ends of the horizontal frame member 2a. The horizontal frame member 2a typically includes an elongated spanning frame segment 4 which may be plastic, metal, wood or fiberglass, for example, or any other suitable rigid material. Each of the vertical frame members 2b typically includes an elongated outer frame segment 3 and an integral inner frame segment 3a which is disposed in substantially perpendicular relationship to the outer frame segment 3. Accordingly, in the assembled tool box skirt 1, the outer frame segment 3 of each vertical frame member 2b is disposed in substantially perpendicular relationship to the spanning frame segment 4 of the horizontal frame member 2a.

The inner frame segment 3a of each vertical frame member 2b is disposed in substantially aligned relationship to the spanning frame segment 4 of the horizontal frame member 2a. Like the spanning frame segment 4, the outer frame segment 3 and the inner frame segment 3a of the vertical frame member 2b may be plastic, metal, fiberglass, wood or any other suitable rigid material. The spanning frame segment 4 of the horizontal frame member 2a, as well as the outer frame segment 3 and the inner frame segment 3a of each vertical frame member 2b, are typically provided with multiple, spaced-apart fastener openings 10, as illustrated in FIG. 4.

While the horizontal frame member 2a and the vertical frame members 2b of the skirt frame 2 are shown in the drawings as being separate elements, it is understood that the horizontal frame member 2a may alternatively be integrally connected to the vertical frame members 2b, with the skirt frame 2 being one continuous piece. Further in the alternative, either or both of the spanning frame segment 4 of the horizontal frame member 2a and the outer frame segments 3 of the vertical frame members 2b may include multiple, aligned frame segments (not shown) which are mounted to the truck tool box 20 in end-to-end relationship to each other in assembly of the skirt frame 2.

As further illustrated in FIGS. 3 and 4, a flexible or resilient skirt 6 extends outwardly from the skirt frame 2. The skirt 6 typically includes multiple vertical skirt bristles 7 which extend downwardly and generally perpendicularly, typically in adjacently-touching relationship to each other from the lower edge of the spanning frame segment 4 of the horizontal frame member 2a and from the lower edge of the inner frame segment 3a of each vertical frame member 2b. The skirt 6 further includes multiple angled skirt bristles 8 which extend downwardly and outwardly from the inner frame segment 3a of the vertical frame member 2b, at an angle with respect to the vertical skirt bristles 7 and in adjacently-touching relationship to each other. The skirt 6 also includes multiple horizontal skirt bristles 9 which extend horizontally outwardly from the outer edge of the outer frame segment 3 of each vertical frame member 2b, in adjacently-touching relationship to each other. The vertical skirt bristles 7, angled skirt bristles 8 and horizontal skirt bristles 9 are typically a stiff, flexible or resilient plastic material. It is understood that the skirt 6 may alternatively include a continuous piece of resilient material (not illustrated) which is mounted on the skirt frame 2.

Referring to FIG. 4, the tool box skirt 1 is attached to the exterior surface of the front panel 21 of the truck tool box 20 typically using multiple fasteners 5, such as threaded bolts, for example. The horizontal frame member 2a is typically initially mounted on the truck tool box 20 by extending the multiple fasteners 5 through the respective fastener openings 10 of the spanning frame segment 4 and through registering fastener openings 21a, respectively, extending through the front panel 21 of the truck tool box 20. Securing nuts 5a (FIG. 2) are then threaded on the ends of the respective fasteners 5 extending into the truck tool box 20 and are tightened against the inner surface of the front panel 21 to fasten the horizontal frame member 2a to the exterior surface of the front panel 21, along and generally parallel to the front bottom edge of the truck tool box 20. Accordingly, as illustrated in FIGS. 1–3, the vertical skirt bristles 7 of the skirt 6, extending vertically downwardly from the spanning frame segment 4, touch or nearly touch the bed bottom 16 of the pickup truck bed 15, thus substantially partitioning the bottom space 11 (FIG. 2) from the remaining, rearwardly-extending portion of the pickup truck bed 15.

After the horizontal frame member 2a is mounted on the front panel 21 of the truck tool box 20, typically using multiple fasteners 5 in the manner heretofore described with respect to FIG. 4, the vertical frame members 2b are also mounted on the front panel 21, at the respective ends of the horizontal frame member 2a and along and generally parallel to the front side edges of the truck tool box 20. As illustrated in FIG. 4, this is carried out typically by extending fasteners 5 through the respective fastener openings 10 of the outer frame segment 3 and inner frame segment 3a and through registering fastener openings 21a provided in the front panel 21; threading securing nuts 5a on the ends of the fasteners 5 extending into the truck tool box 20, as illustrated in FIG. 2; and tightening the nuts 5a against the inner surface of the front panel 21. Accordingly, as further illustrated in FIGS. 1–3, the vertical skirt bristles 7 which extend from the bottom edge of the inner frame segment 3a of each vertical frame member 2b touch or nearly touch the bed bottom 16 of the truck bed 15. Furthermore, the angled skirt bristles 8, which extend downwardly and outwardly at an angle from the inner frame segment 3a of each vertical frame member 2b, touch or nearly touch either the bed bottom 16 or the corresponding bed side 17 of the truck bed 15, thus partitioning the side spaces 12 (FIGS. 3 and 4) from the remaining, rearwardly-extending portion of the truck bed 15. The horizontal skirt bristles 9, which extend horizontally outwardly from the outer edge of the outer frame segment 3 of each vertical frame member 2b, touch or nearly touch the corresponding bed side 17 of the truck bed 15, thus partitioning the side spaces 12 from the remaining portion of the truck bed 15. It is understood that the fasteners 5 are just one example of a suitable technique for mounting the skirt frame 2 on the truck tool box 20 and that alternative techniques known by those skilled in the art may be used in addition to or instead of the fasteners 5 to mount the skirt frame 2 on the truck tool box 20.

Figure 1:
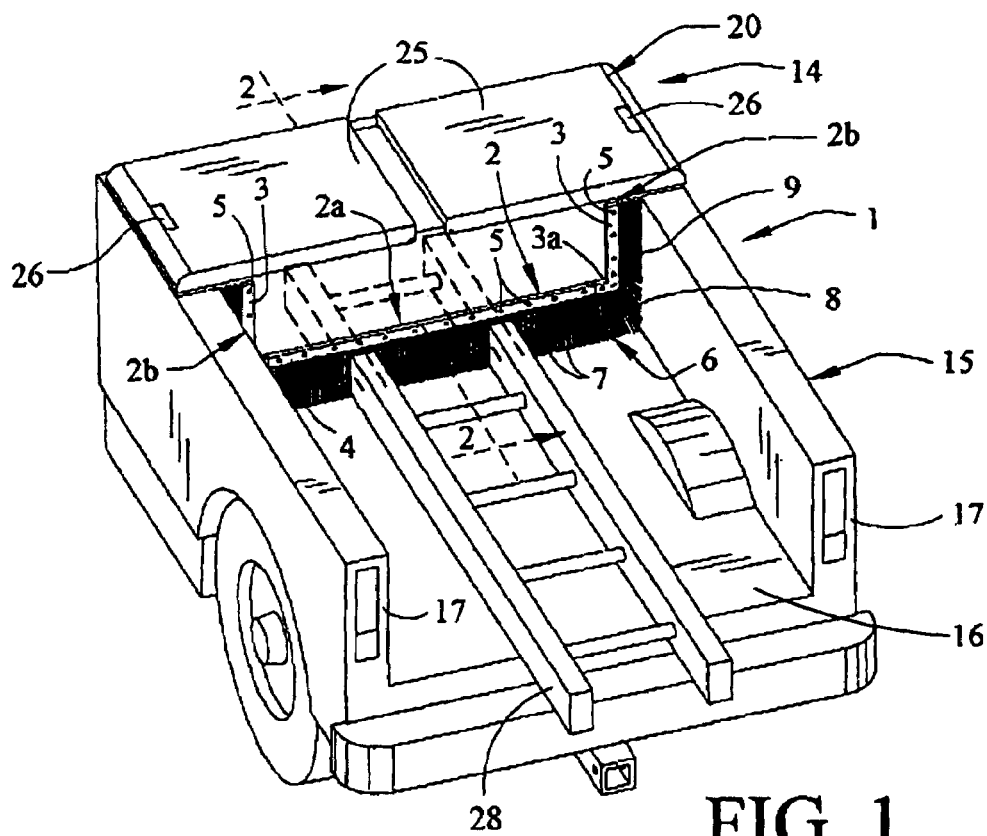
FIG. 1 is a rear perspective view of a pickup truck bed of a conventional pickup truck, with a tool box mounted in the pickup truck bed and an illustrative embodiment of the tool box skirt of the present invention mounted in functional position on the tool box.

From a consideration of FIGS. 1 and 2, it will be appreciated by those skilled in the art that the skirt 6 of the tool box skirt 1 blocks trash such as paper, plastic and paper bags and leaves, for example, from inadvertently being blown or pushed from the truck bed 15 and into the bottom space 11, side spaces 12 (FIG. 3) and rear space 13 between the truck tool box 20 and the truck bed 15. Furthermore, the resilient flexibility of the vertical skirt bristles 7, angled skirt bristles 8 and horizontal skirt bristles 9 of the skirt 6 enable elongated objects, such as a ladder 28, for example, to be positioned in the truck bed 15 and extend into the bottom space 11 and/or side spaces 12. This capability of the tool box skirt 1 both blocks the entry of debris into the relatively inaccessible bottom space 11 and/or side spaces 12 while permitting use of those areas of the truck bed 15 for storage and/or transport of items.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. A tool box skirt for mounting on a truck tool box in a pickup truck bed and preventing entry of debris into spaces between the truck tool box and the pickup truck bed, comprising:
   a skirt frame for attachment to the truck tool box;
   a skirt carried by said skirt frame for partitioning the spaces in the pickup truck bed; and
   wherein said skirt comprises a plurality of skirt bristles extending from said skirt frame.

2. The tool box skirt of claim 1 wherein said skirt frame comprises a pair of vertical frame members and a horizontal frame member extending between said pair of vertical frame members.

3. The tool box skirt of claim 2 wherein said horizontal frame member comprises an elongated spanning frame segment.

4. The tool box skirt of claim 3 wherein each of said pair of vertical frame members comprises an elongated outer frame segment and an inner frame segment disposed in generally perpendicular relationship to said outer frame segment and in generally aligned relationship to said spanning frame segment of said horizontal frame member.

5. A tool box skirt for mounting on a truck tool box in a pickup truck bed and preventing entry of debris into spaces between the truck tool box and the pickup truck bed, comprising:
   a skirt frame for attachment to the truck tool box, said skirt frame having a pair of vertical frame members and an elongated horizontal frame member extending between said vertical frame members; and
   a skirt carried by said skirt frame for partitioning the spaces in the pickup truck bed, said skirt having a plurality of vertical skirt bristles extending generally perpendicularly from said horizontal frame member.

6. The tool box skirt of claim 5 wherein said horizontal frame member comprises an elongated spanning frame segment and wherein said vertical skirt bristles extend from said spanning frame segment.

7. The tool box skirt of claim 5 further comprising a plurality of angled skirt bristles extending from each of said vertical frame members at an angle with respect to said vertical skirt bristles and a plurality of horizontal skirt bristles extending from each of said vertical frame members adjacent to said angled skirt bristles.

8. The tool box skirt of claim 7 wherein said horizontal frame member comprises an elongated spanning frame segment and wherein said vertical skirt bristles extend from said spanning frame segment.

9. The tool box skirt of claim 5 wherein each of said pair of vertical frame members comprises an elongated outer frame segment and an inner frame segment disposed in generally perpendicular relationship to said outer frame segment.

10. The tool box skirt of claim 9 wherein said horizontal frame member comprises an elongated spanning frame segment and wherein said vertical skirt bristles extend from said spanning frame segment.

11. The tool box skirt of claim 9 further comprising a plurality of angled skirt bristles extending from each of said vertical frame members at an angle with respect to said vertical skirt bristles and a plurality of horizontal skirt bristles extending from each of said vertical frame members adjacent to said angled skirt bristles.

12. The tool box skirt of claim 11 wherein said horizontal frame member comprises an elongated spanning frame segment and wherein said vertical skirt bristles extend from said spanning frame segment.

13. A method of preventing inadvertent entry of debris from a pickup truck bed into spaces between a truck tool box and the pickup truck bed, comprising:
   providing a tool box skirt comprising a skirt frame and a skirt comprising a plurality of skirt bristles carried by said skirt frame; and
   partitioning the spaces from the pickup truck bed by mounting said skirt frame of said tool box skirt on the truck tool box and extending said skirt between the spaces and the pickup truck bed.

14. The method of claim 13 wherein said skirt frame comprises a pair of vertical frame members and a horizontal frame member extending between said vertical frame members.

15. The method of claim 13 wherein said skirt frame comprises a pair of vertical frame members and a horizontal frame member extending between said vertical frame members, and wherein said skirt comprises a plurality of vertical skirt bristles carried by said horizontal frame member and a plurality of angled skirt bristles and a plurality of horizontal skirt bristles carried by each of said vertical frame members.

* * * * *